March 10, 1942.    H. L. NEWELL    2,275,918
CONTROL DEVICE
Filed May 17, 1940    2 Sheets-Sheet 1
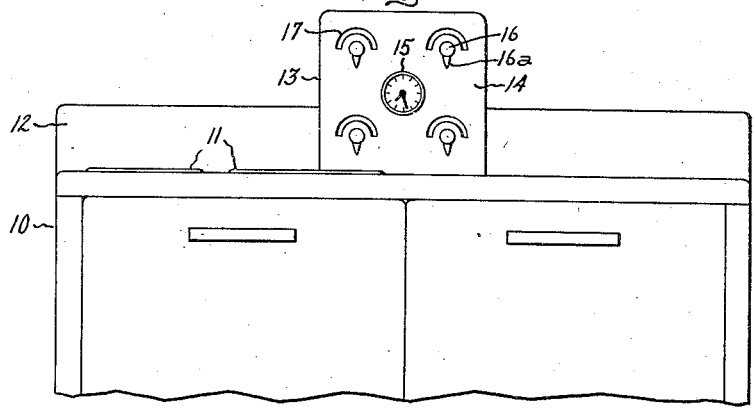
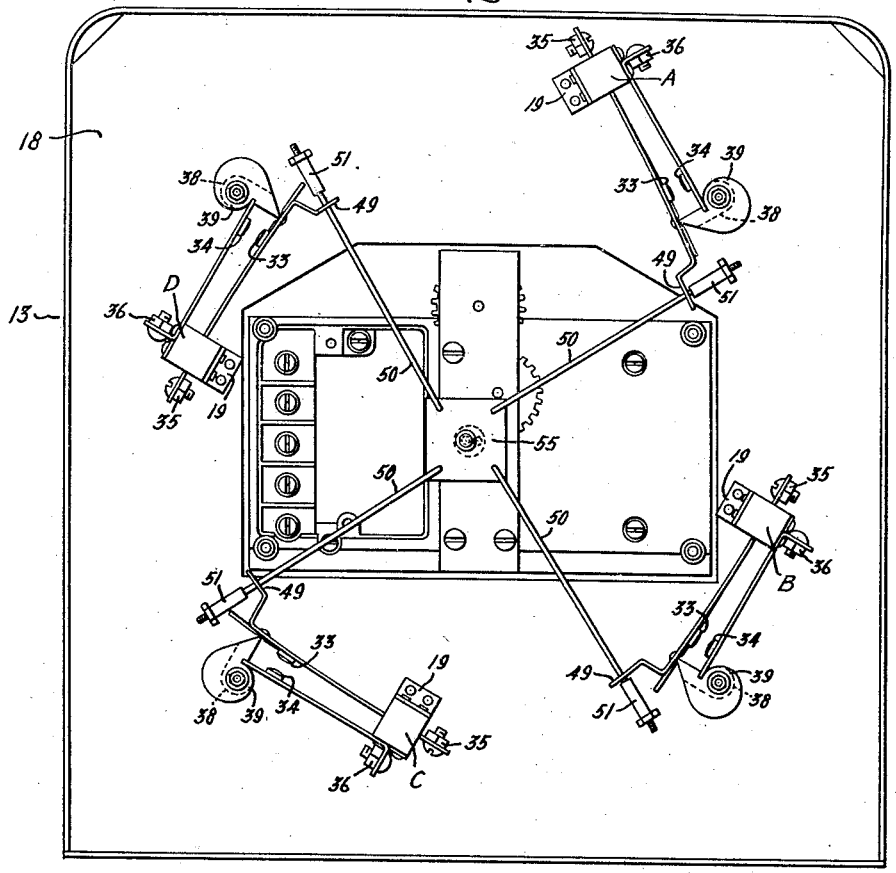
Inventor:
Heber L. Newell,
by Harry E. Dunham
His Attorney.

March 10, 1942.  H. L. NEWELL  2,275,918
CONTROL DEVICE
Filed May 17, 1940   2 Sheets-Sheet 2
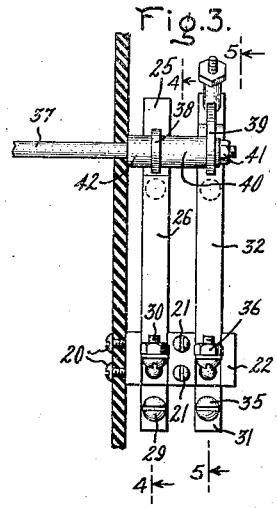
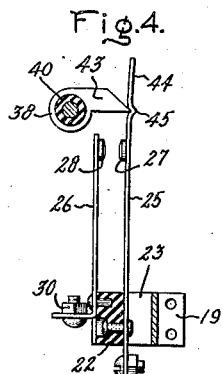
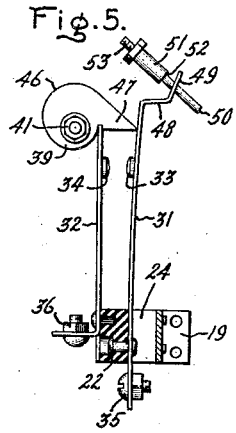
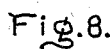
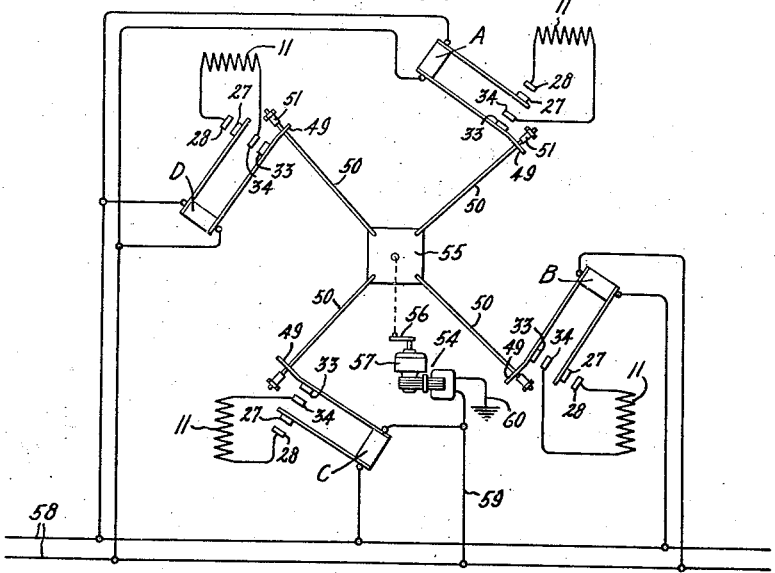
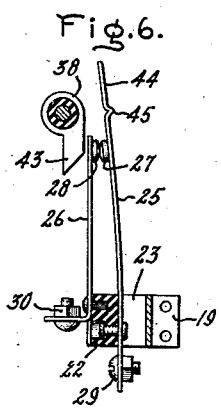
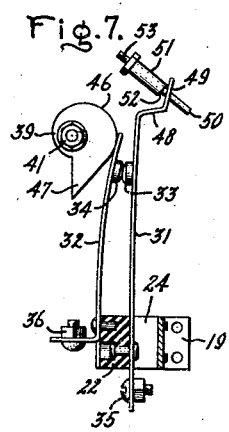
Inventor:
Heber L. Newell,
by Harry E. Dunham
His Attorney.

Patented Mar. 10, 1942

2,275,918

UNITED STATES PATENT OFFICE 2,275,918

CONTROL DEVICE

Heber L. Newell, Stratford, Conn., assignor to General Electric Company, a corporation of New York Application May 17, 1940, Serial No. 335,792

5 Claims. (Cl. 200—32)

My invention relates to a control arrangement and more particularly to a new and improved control arrangement for controlling the operation of a heating circuit so that the heat output of the circuit may be readily varied in small increments from zero to a predetermined maximum.

More particularly my invention relates to a control arrangement for controlling an electrical circuit having one or more resistance units so that the length of time that each unit is energized in a predetermined cyclical period may be varied from energization for zero time, corresponding to an off position for the particular unit, to energization for 100 per cent of the time, corresponding to maximum output of the particular circuit.

While not limited thereto, my invention is particularly applicable for controlling the surface units of an electric range so that the wattage output of these units may be varied in small increments from zero to a predetermined maximum.

In controlling the surface units of an electric range, it has been more or less common practice to provide the unit with a separate switch for connecting the unit to various supply voltages in various combinations to obtain different degrees of heat and as generally provided the switch has separate and distinct positions to produce separate heats, such as low, medium and high heat for example. With such an arrangement no account can be taken of the different losses which occur with different types of cooking utensils nor can any account be taken of the different amounts of heat required by various cooking operations. Thus, the flexibility of such a control arrangement is greatly limited.

In one of its aspects my invention contemplates the provision of improved and relatively inexpensive means for controlling the surface unit of an electric range so that the wattage output thereof may be varied in small increments and thereby regulated in accordance with the different heat losses from a particular cooking vessel or the different heats required by different cooking operations.

In another aspect my invention contemplates the provision of new and improved control means by which all of the surface units of an electric range may be controlled in the aforementioned manner and in which improved and relatively inexpensive switch means for each of the surface units are periodically controlled by a single mechanical device.

In accordance with my invention, I provide suitable switch means for controlling a heating element in a heating circuit having one or more heating elements. A motor-driven member having a definite time cycle of operation is connected to the switch means so that as the member is operated the switch means is periodically opened and closed during the time cycle to energize and deenergize intermittently the heating element. Adjustable means are provided for the switch means for controlling the length of time the switch means remains closed during the time cycle so that the wattage output of the heating element can be varied. This adjustable means is operable between two limiting positions in one of which the switch means is held open to deenergize the heating element irrespective of the operation of the motor-driven member, and in the second of which the switch means is held closed to energize the heating element continuously irrespective of the motor-driven member.

When the heating circuit has a plurality of heating elements, means are provided for periodically and sequentially operating the switch means for the heating elements in accordance with the operation of the motor-driven member and adjustment means are provided for each of the switch means so as to vary the wattage output of each heating element. In accordance with my invention the switch means in such a circuit will be symmetrically arranged with relation to the motive means so that the load on the motive means due to the switch means is balanced.

Moreover, irrespective of whether or not the controlled circuit has but a single heating element or a plurality of heating elements, the connection means between the motive means and the switch means are constructed and arranged so that the load is completely removed from the motive means when the switch means is either in its position to deenergize completely its associated heating element or in its position to energize continuously its heating element.

In one specific embodiment of this invention, I provide a unitary control arrangement comprising a suitable motor and a plurality of simple switches, one switch for each heating element in the circuit being controlled. Driven by the motor is an eccentric member upon which is mounted a plurality of rods, one for each switch. These rods are connected to the switches so that in each rotation of the eccentric member a portion of each switch is caused to oscillate or reciprocate so that the contacts of the switch are periodically opened and closed. Arranged to operate upon another portion of each switch is a cam device which is constructed and arranged so as to control the amount of movement required of said rod to move the contacts of the switch from the closed position to the opened position or from the opened position to the closed position. By means of this cam device the length of time that the contacts of the switch are in engagement during one revolution of the eccentric member may be regulated and the cam is constructed and arranged so as to have two limiting positions in one of which the contacts of the switch are held open irrespective of operation of the member and in the other position of which the contacts are held closed irrespective of the operation of the member. Thus, the heating element controlled by any particular switch may be completely de-energized, continuously energized, or intermittently energized for variable lengths of time to produce a substantially infinite number of different wattage outputs between zero and the predetermined maximum rating of the element.

While the foregoing sets forth the primary aspects of my invention, further objects and advantages thereof will appear as the following description proceeds and the features of novelty which characterize my invention will be set forth in the claims appended to and forming a part of this specification.

For a fuller understanding of my invention, reference should be had to the accompanying drawings in which Fig. 1 is a partial elevation of an electric range showing my improved control mounted thereon; Fig. 2 is a rear enlarged view of my unitary control showing the component elements thereof; Fig. 3 is an enlarged plan view of one of the improved switches of my improved control device showing details thereof; Fig. 4 is a side elevation partly in section taken on the line 4—4 of Fig. 3 and showing this portion of my improved switch in the open circuit position; Fig. 5 is a side elevation partly in section taken on the line 5—5 of Fig. 3 and showing the open circuit position of this portion of my improved switch; Fig. 6 is a view similar to Fig. 4 showing this portion of the switch in the closed circuit position; Fig. 7 is a view similar to Fig. 5 showing this portion of the switch in its closed circuit position at the maximum setting of the switch; and Fig. 8 is a circuit diagram showing the circuit connections of the control device and the heating elements controlled thereby.

Referring now to the drawings and particularly Fig. 1, it will be observed that I have shown my improved control arrangement as applied to an electric range 10 having a plurality of surface units 11 and a backsplasher plate 12. It will be understood that the electric range shown is merely for the purposes of illustration and that my improved control device may be employed with any suitable electric range. Moreover, it is to be understood that the control arrangement of this invention is not limited to controlling the heating circuits of an electric range but may be used for controlling heating circuits or electrical circuits in general. However, the control arrangement disclosed herein is particularly adaptable for controlling the electrical circuits of a range due to its compactness and simplicity.

Mounted centrally of the backsplasher 12 is my improved control device which in the form shown comprises a casing 13 having a front wall 14. Centrally arranged in the front wall 14 is a clock 15 and symmetrically spaced about the clock is a plurality of switch operating members 16. Each of the switch operating members projects from the front wall of the casing and provided in the front wall above each member is a substantially semi-circular slot 17 which serves as a scale which cooperates with the index portion 16a of the member 16 to indicate the various positions of the switch operating members. In the preferred form of this invention each of the slots 17 will be provided with a translucent member so that they may be illuminated by means of a suitable pilot lamp (not shown).

Referring now to Fig. 2, which is a rear view of the casing 13 with the rear cover plate removed to show the operating elements of the control arrangement, it will be observed that the casing encloses a panel 18 of some suitable insulating material upon which is mounted a plurality of switch members A, B, C and D. Each of the switch members is associated with one of the control members 16 extending from the front wall of the casing 13. As illustrated, the switch members are symmetrically spaced about the center of the panel 18 and are identical in construction. The reason for this symmetrical spacing will be more fully brought out hereinafter.

Since the switch members are identical, only one of the members will be described in detail and the corresponding parts of the remaining switch members will be given the same reference numerals as the parts of the switch described. Referring now to Figs. 3 to 7, it will be observed that each switch member comprises a supporting bracket 19 which is suitably secured to the panel 18 by means of screws 20. Mounted on the supporting bracket 19 and secured thereto by screws 21 is a block 22 of some suitable insulating material having a pair of grooves 23 and 24 which in cooperation with the supporting bracket 19 form openings for receiving switch arms. Mounted on the portion of the insulating block nearest the panel 18 is a pair of switch arms 25 and 26 upon which are mounted cooperating contact elements 27 and 28 respectively. As shown in Figs. 3 and 4, the switch arms 25 and 26 are mounted so as to be spaced from each other by an insulating block 22, each of the switch arms being suitably secured at one end to the block and having at said fixed end suitable means 29 and 30 respectively for making electrical connections thereto. The switch arms 25 and 26 are preferably made from some suitable resilient material, such as phosphor-bronze, and the arm 25 is mounted so as to be biased towards the arm 26 so that the contacts 27 and 28 will normally be in engagement with each other.

Mounted on the portion of the insulating block 22 remote from the panel 18 is a second set of switch arms 31 and 32 which are secured at one end to the insulating block 22 and are provided at their free ends with contact members 33 and 34 respectively. Each of the switch arms 31 and 32 is provided adjacent its fixed end with suitable terminal members 35 and 36 respectively. As in the case of the switch arms 25 and 26, the switch arms 31 and 32 are made from some suitable resilient material, such as phosphor-bronze, and the switch arm 31 is arranged so as to be biased toward the switch arm 32 so that the contacts 33 and 34 are normally in engagement with each other. As will appear more fully hereinafter, the contacts 33 and 34 are arranged so as to control one supply lead to a heating element 11 and the contacts 27 and 28 are arranged to control the opposite supply lead to the same heating element. Thus, when both pairs of contacts are open, as shown in Figs. 4 and 5, the heating unit is completely disconnected from the source of supply and when both sets of contacts are closed, as shown in Figs. 6 and 7, the heating element is energized.

In order to control manually the operation of the contacts 27—28 and 33—34, there is provided a shaft 37 extending through the panel 18 from the operating member 16. This shaft 37 is provided at its outer end with a pair of cam members 38 and 39 which are spaced from each other by means of a spacer 40 and are held on the shaft by means of a nut 41, a suitable spacer 42 being provided between the cam 38 and the panel 18. As shown in Fig. 4, the cam 38 is provided with a projection 43 which is adapted to engage the portion 44 of the arm 25. Provided in the portion 44 is a detent 45 with which the end of the projection 43 is adapted to cooperate to latch the cam and contact arm in the position shown in Fig. 4 in which position the contacts 27—28 are positively held out of engagement. Movement of the cam 38 counterclockwise from the position shown in Fig. 4 permits the arm 25 to move to the left to cause the closing of contacts 27—28. It is apparent therefore that the cam 38 with its projection 43 is used to move the spring 25 so that the contacts 27—28 may serve as an "on-off" switch for one side of the electric supply line to a particular heating unit.

Referring now to Fig. 5, it will be observed that the cam 39 is provided with a cam surface 46 which is adapted to engage the free end of the contact arm 32 and with a projection 47 which is adapted to engage the contact arm 31. The cam surface 46 is constructed so that movement of the cam in a counterclockwise direction, as viewed in Fig. 5, causes the contact arm 32 to be displaced to the right. The projection 47, on the other hand, is constructed so that upon rotation of the cam clockwise to the extreme shown in Fig. 5, it engages the free end of the contact arm 31 causing this arm to be displaced to the right to provide an off position for the contact members 33—34. Further details of the operation of the cam 39 will more fully appear hereinafter.

As previously pointed out, this invention relates to improved means for controlling the heating circuit for the surface unit of an electric range so that the output thereof may be varied in small increments from zero to a predetermined maximum. The means for effecting this result in the particular embodiment of this invention illustrated will now be described. Referring to Figs. 2, 5 and 7, it will be observed that at the free end of the contact arm 31 there is integrally formed an offset bracket 48 having a flat projection 49 which is provided with an opening (not shown) into which the free end of a rod 50 extends. Threadedly mounted on the free end of the rod 50 is a sleeve 51 having a shoulder 52 which is adapted to engage the flat projection 49. The threaded portion 53 at the end of the rod 50 is made sufficiently long that small adjustments in the position of the sleeve 51 relative to the projection 49 may be made. The opening in the projection 49 is made sufficiently large so that the rod 50 may move freely therein. As will presently appear, the rod 50 is adapted to move with a reciprocatory movement having a definite stroke and during this reciprocatory movement the shoulder 52 is moved into engagement with the projection 49 to cause the contact arm 31 to be moved to the right.

By varying the position of the projection 49 relative to the shoulder 52 the amount of free movement required of the rod before it moves the arm 31 to open the contacts 33—34 may be adjusted. This is the function served by the cam 39. As previously described, rotating the cam 39 counterclockwise from the position shown in Fig. 5 first causes the cam projection 47 to be moved out of engagement with the contact arm 31 whereupon the arm 31 moves to the left to cause the contact 33 to be moved into engagement with the contact 34. Upon subsequent counterclockwise rotation of the cam 39 the contact arm 32 is moved to the right which movement is transmitted to the contact arm 31 whereby both contact arms are stressed thus causing the projection 49 to be moved down on the rod 50 and farther away from the shoulder 52. Increasing the distance between the shoulder 52 and the projection 49 has the effect of increasing the amount of free movement of the rod 50 before it causes the contacts 33 and 34 to be opened. Thus by increasing the distance between the projection 49 and the shoulder 52 through rotation of the cam 39 counterclockwise, the length of time that the contacts 33—34 remain in engagement during the stroke of the rod 50 is increased.

In the limit of the counterclockwise rotation of the cam 39 shown in Fig. 7, the projection 49 is moved sufficiently far down on the rod 50 that the shoulder 52 never engages it during the reciprocatory movement of the rod 50. Thus, in this limiting position, the contacts 33 and 34 are held permanently closed irrespective of the operation of the rod 50. In the limit of the clockwise rotation of the cam 39, as previously described, the projection 47 engages the contact arm 31 so as to cause the contact 33 to be moved away from the contact 34. The projection 47 is made long enough so that it moves the contact arm 31 sufficiently far to the right to prevent engagement between the shoulder 52 and the projection 49 during the reciprocatory movement of the rod 50. Thus, in this position the contacts are permanently held open irrespective of the operation of the rod 50 and there is substantially no load on the rod. In all positions of the cam 39 between these two limiting positions, the shoulder 52 will engage the projection 49 for variable portions of the stroke of the rod 50 depending upon the setting of the cam 39. Thus, by varying the setting of the cam 39 between its two limiting positions, the percentage of time the contacts 33—34 are in engagement during the reciprocatory movement of the rod 50 may be changed to regulate the average wattage output of the heating unit controlled by the contacts 33—34.

The means for causing the reciprocation or the reciprocatory movement of the rod 50 is best illustrated in Figs. 2 and 3. Referring to these figures, it will be observed that there is provided a motor 54 upon which is eccentrically mounted a plate 55. In the preferred form of this invention, the plate 55 will be connected to the motor through a suitable crank 56 and a reduction gear 57. The motor 54 may be any suitable constant or variable speed device. In the preferred form of my invention, however, the motor 54 is a synchronous motor of the type which can also be used for driving the clock 15 through a suitable mechanism (not shown). The gear unit 57 driven by the motor is such that the crank 56 connected thereto will be rotated at approximately one revolution per minute. Connected to the plate 55 and preferably at the corners thereof are the rods 50. The connection between the rods 50 and the plate is sufficiently loose so that the rods may pivot a slight amount relative to the plate during the rotation thereof by the crank 56.

In view of the foregoing, it is apparent that the plate 55 is moved with a rotary motion so that the center thereof describes a circle the radius of which is equal to the length of the crank arm 56. With the arms 50 loosely connected to the plate 55 the rotary movement of the plate is converted into a reciprocatory movement of the rod and the stroke of this movement is substantially equal to the diameter of the circle described by the center of the plate. Moreover, in each revolution of the crank 56 each of the rods 50 reciprocates once relative to the projection 49 on the contact arm 31. It is therefore apparent that the time for one complete cycle of the plate 55 defines a timing cycle within which the contacts 33—34 are intermittently opened and closed. By varying the position of the cam surface 46, as previously described, the relative length of time that the contacts are in either the opened or closed position during the time cycle of operation of the plate 55 may be varied from open for 100 per cent of the time to closed for 100 per cent of the time.

As shown in Figs. 2 and 8, the plate 55 is centrally positioned with respect to the symmetrically arranged switch members A, B, C and D. With such a construction and arrangement, the driving load on the motor 54 is a minimum for while one switch is pulling against the motor unit, the opposite switch is aiding the motor and when one switch is in its maximum position, the opposite switch is in its minimum position. Thus, balanced connecting means are provided between the motor and the switch members for accomplishing a sequential operation of the switch members. This reduction and equalization of the load on the motor has a marked beneficial effect on the life of the motor means.

In order to increase further the life of the motor unit, each of the switch means is arranged so that when the contact members are either in the 100 per cent on or 100 per cent off position the projection 49 will be moved completely out of engagement with the shoulder 52. Under these circumstances the rods 50 are unloaded and the load on the motor is substantially completely removed. Thus, with all of the switches in either the full on or full off position, the motor has only to drive the substantially unloaded plate 55 and the clock 15. This is important as the life of any motor, and particularly a synchronous motor, is materially increased if the load thereon is light.

Referring now to Fig. 8 which shows the circuit connections for my improved control device when it is used for controlling the surface units 11 of an electric range, it will be noted that, as diagrammatically shown, each surface unit comprises a single heater element and that each of these elements is connected through one of the switch members A, B, C or D to a two-wire source of supply. It will also be observed that the switch members, as previously described, are arranged so as to disconnect both sides of the heating unit 11 when the unit is in the off position. Also connected to the supply leads 58 is a lead 59 which is connected to one side of the motor 54, the other side of the motor 54 being connected to ground through the lead 60. It will be observed that no switch is placed in the supply circuit for the motor 54, the motor running continuously to operate the clock 15. While this latter is the preferred construction since it reduces the overall cost of the range control, it is, of course, obvious to those skilled in the art that a separate motor could be used for operating the clock 15 and under the circumstances an "on-off" switch would be provided for the motor 54.

Considering now the operation of my improved control device as applied to the surface units of an electric range, it will be assumed that each of the control switches A, B, C and D is in the position shown in Fig. 2. When in this position each of the control knobs 16 lies with its index 16a extending vertically downward as shown in Fig. 1 and each of the heating elements 11 is disconnected from the source of supply as shown in Fig. 8. Moreover, since the motor 54 is energized, the plate 55 is being moved with a rotary movement and the clock 15 is operating. If now it is desired to operate one of the surface units, for example, the surface unit controlled by the switch A, the knob 16 in the upper left-hand corner of the control casing shown in Fig. 1 will be turned clockwise. This causes the cams 38 and 39 to be rotated counterclockwise as viewed in Figs. 2, 4 and 5. This counterclockwise movement first causes the contact arms 25 and 31 to be released so that the contacts 27—28 and 33—34 are closed. Assuming now that the knob 16 is rotated clockwise until the index 16a thereof extends vertically upward, both cams, and particularly cam 39, will be rotated counterclockwise so that the contact arm 32 is moved to the right causing a similar movement of the control arm 31 and a downward movement of the projection 49 of the shaft 50. With the adjusting knob 16 moved the amount assumed, the projection 49 will be moved downwardly relative to the rod 50 an amount sufficient to cause the contacts 33 and 34 to remain in engagement for substantially half of the stroke of the rod 50. With the motor 54 operating continuously, the rod 50 is continuously reciprocated and with the cam 39 adjusted to the position assumed the shoulder 52 will engage the projection 49 during each stroke of the rod to open and close the contacts 33 and 34 periodically. This causes periodic energization and deenergization of the heating unit 11 and with the particular setting assumed the average wattage output of the heating unit will be substantially 50 per cent of the maximum wattage output for the heating unit.

If it is desired to operate a second heating unit during the operation of the first heating unit 11, it is merely necessary to turn the corresponding control knob 16 to a position corresponding to the amount of heat desired. This turning of the control knob causes the contact arm 31 of the second switch, say the switch D, to be moved so as to be intermittently operated by the reciprocatory movement of its arm 50 in the manner described above.

If it should be desired to operate a particular heating unit 11 at its maximum wattage output, this may be accomplished by rotating the proper control knob 16 clockwise until the index 16a thereof approaches the right-hand end of the indicating scale 17. When the knob 16 is rotated to this position, the cams 38 and 39 will be turned counterclockwise to the position shown in Figs. 6 and 7. In this position both the contacts 27—28 and 33—34 will be held in engagement and, as previously described, the projection 49 will have been moved downwardly on the rod 50 an amount sufficient to prevent it being engaged by the shoulder 52 during the continuous reciprocation of the rod 50. Thus, both pairs of contacts are continuously closed irrespective of the operation of the motor 54 and the heating unit 11 is continuously energized to produce its maximum wattage output. It is also to be noted that in this extreme position with the projection 49 completely out of contact with the shoulder 52 the load on the motor from this switch is substantially completely removed.

From the foregoing detailed description, it is apparent that I have provided a relatively simple, inexpensive and improved control arrangement for controlling the wattage output of an electric heating circuit and particularly the wattage output for the heating circuit of the surface units of an electric range so that this output may be varied from zero to a predetermined maximum in increments sufficiently small to permit the user to take account of the heat losses from different cooking utensils and the different heat outputs required for different cooking operations. It is to be particularly observed that I have provided improved means for providing a heating circuit so as to produce different wattage outputs thereof without the use of multiple voltage sources or circuit changing switches. Moreover, I have provided a relatively simple control arrangement for obtaining flexible control of an electrical circuit and particularly an electrical heating circuit.

It is to be particularly observed that I have provided an improved control arrangement which comprises a plurality of switch members which are periodically and sequentially operated by a single motor means and which are symmetrically arranged with reference to the motor means so that balanced loading of the motor means is obtained. Moreover, the connection between the motor means and each switch means is such that in extreme positions of the switch means corresponding to fully on or fully off the connection is ineffective so that substantially no load is applied to the motor.

While I have shown my improved control device as applied to the surface units of an electric range, it will be understood that this control device is of more general application and may be employed for controlling electrical circuits in general. Moreover, it is apparent that the plate 55 could be used to reciprocate more rods than the four shown and additional switches such as a switch for a convenience outlet or a switch for the oven heating unit of the range could be operated by my improved control device in the same manner the surface unit switches described.

Therefore, while I have shown one modification of my improved control arrangement, it is apparent that many other modifications may be made and I, therefore, intend to cover in the appended claims all such modifications as are within the true spirit and scope of this invention.

What I claim as new and desire to secure by Letters Patent of the United States is:

1. Electric circuit controlling apparatus comprising a motor, a crank driven by said motor, a plate connected to said crank so as to move with a rotary motion about an axis displaced from the axis of said motor, cooperating switch contacts supported respectively on an adjustable switch arm and an oscillatable switch arm, means for connecting and oscillatable switch arm to said disk so that said arm is oscillated in accordance with rotation of said disk and said contacts are thereby periodically opened and closed, and means for adjusting said adjustable arm so that the length of time said contacts are in engagement in the cycle of movement of said oscillatable arm may be varied.

2. A periodically operated switch comprising switch means having a pair of cooperating contacts one of which is mounted on a movable arm, a substantially constant speed motor, eccentric means driven by said motor, a connecting rod connecting said eccentric means and one of said switch arms so that rotation of said eccentric means causes reciprocatory movement of said arm to intermittently open and close said switch contacts once during every revolution of said eccentric means, and means for adjusting said arm relative to said connecting rod so that the point in the stroke of said rod at which the switch means are moved to the circuit opening position may be varied to vary the length of time said switch means are in the circuit closing position.

3. Electric circuit controlling apparatus comprising a switch having a pair of normally closed cooperating contacts, one of said contacts being supported on a resilient contact arm, a power-driven reciprocating member, said arm having a projection adapted to be engaged by said reciprocating member during its movement to effect movement of said arm and opening of said contacts, and means for manually positioning said projection relative to said reciprocating member to vary the percentage of stroke of said reciprocating member said contacts are open.

4. Electric circuit controlling apparatus comprising a switch, said switch having a relatively fixed contact supported on a first resilient contact arm and a relatively movable contact supported on a second resilient contact arm, a power-driven reciprocating member, said second contact arm having a projection adapted to be engaged by said reciprocating member during its movement to effect movement of said second arm and actuation of said contacts, and manually operable means for stressing said first and second contact arms to vary the position of said contacts and said projection relative to said reciprocating member whereby the percentage of stroke of said reciprocating member said contacts are actuated may be varied.

5. Electric circuit controlling apparatus comprising a switch, said switch having a relatively fixed contact supported on a first resilient contact arm and a relatively movable contact supported on a second resilient contact arm, a power-driven reciprocating member, said second contact arm having a projection adapted to be engaged by said reciprocating member during its movement to effect movement of said second arm and actuation of said contacts, and a manually movable cam member having a cam surface adapted to engage said first contact arm and effect movement of both of said contact arms and said projection relative to said reciprocating member to vary the percentage of stroke of said reciprocating member said contacts are actuated, said cam member having a portion adapted to engage said second contact arm independently of said first contact arm in an extreme position of said cam member to effect separation of said contacts and a movement of said projection beyond the path of movement of said reciprocating member.

HEBER L. NEWELL.